United States Patent [19]

Swenson

[11] 4,295,606
[45] Oct. 20, 1981

[54] HEATING SYSTEM

[76] Inventor: Paul F. Swenson, 25525 Edgecliffe, Euclid, Ohio 44132

[21] Appl. No.: 933,500

[22] Filed: Aug. 14, 1978

[51] Int. Cl.³ .............................................. F24D 5/00
[52] U.S. Cl. .................................. 237/12.1; 126/101; 237/67; 60/690
[58] Field of Search ...................... 237/67, 73, 74, 9 R, 237/7, 12.1; 236/82; 126/110 E, 101; 60/690, 691, 692, 693; 415/175; 431/20; 98/33 A, 33 R

[56] References Cited

U.S. PATENT DOCUMENTS

| | | | |
|---|---|---|---|
| 910,036 | 1/1909 | Wolfson | 237/73 X |
| 917,483 | 4/1909 | Peck | 98/33 A |
| 1,376,326 | 4/1921 | Evans | 237/9 R X |
| 1,558,223 | 10/1925 | Behringer et al. | 60/690 |
| 2,065,251 | 12/1936 | Sweeley et al. | 126/101 |
| 2,075,986 | 4/1937 | Hennebohle | 431/20 |
| 2,309,356 | 1/1943 | Peterson | 237/12.1 |
| 2,815,175 | 12/1957 | Swenson | 236/82 |
| 3,365,133 | 1/1968 | Norton et al. | 237/12.1 X |
| 3,404,674 | 10/1968 | Albert | 126/101 |
| 3,538,709 | 11/1970 | Pensel | 60/670 |
| 4,010,378 | 3/1977 | Tharpe et al. | 60/693 X |

FOREIGN PATENT DOCUMENTS 1013027 8/1957 Fed. Rep. of Germany ........ 431/20
433993 1/1912 France ..................................... 237/9

Primary Examiner—Albert J. Makay
Assistant Examiner—Henry Bennett

[57] ABSTRACT

The specification and drawings disclose a heating system comprising a once-through, closed-loop type vapor generator fired by a modulating gas burner controlled to fire at a rate proportional to the demand level within a space to be heated. A vapor power turbine is directly connected to receive the output from the generator to operate at a variable speed in response to demand level within the space. Vapor exhaust from the turbine is conducted through a condenser, where it gives up its heat and becomes liquid, and returns to the vapor generator. Air for heating the space is conducted over the condenser by a fan directly driven at a variable speed by the turbine.

12 Claims, 4 Drawing Figures

HEATING SYSTEM

BACKGROUND OF THE INVENTION

The subject invention is directed toward the art of heating, and more particularly, to a space heating system.

The invention is particularly suited for use as an air heating system for residential space heating requirements and will be described with particular reference thereto; however, as will become apparent, the invention is capable of broader application and could be used by many different heating systems.

The most common residential air heating system comprises a furnace including a heat exchanger heated by a single stage gas burner. A simple on-off, electrically operated room thermostat controls the firing of the burner. The air to be heated is conducted through the heat exchanger and to the space by an electric motor-driven fan which is operated whenever the burner is firing and furnace bonnet temperature commands or, alternatively, continuously driven to maintain a constant air circulation.

So long as fuel costs were relatively low, the prior art heating systems were acceptable. However, with recent fuel shortages and drastically increasing fuel costs, the low seasonal efficiency and other problems or shortcomings of these systems have made them comparatively undesirable.

To explain, it should be understood that the systems were normally substantially oversized in terms of their maximum heating capacity. This was primarily the result of conservatism on the part of architects and builders. Because of the oversizing, the systems operated far below their peak throughout the majority of the heating season. This type of operation was extremely inefficient because it produced frequent cycling which resulted in excessive losses in the form of heated air and combustion products lost up the chimney. During 90% of the heating season less than 50% of design capacity is required. Modulation, therefore, is the key to high seasonal efficiency. A heating surface that is large enough for design capacity can, with modulation, obtain maximum efficiency at lower ranges provided secondary air is also modulated.

An additional problem and a cause of substantial inefficiency was the electric motor-driven fan. In the typical installation, the fan was sized for maximum heating requirements. As noted earlier, this generally represents only a minor portion of the heating season. Consequently, the systems had a high electric power cost for the motor and a high fan noise level. In addition, the frequent cycling produced intermittent drafts within the residence.

Other typical disadvantages and problems with the described prior art systems included: inability to operate during an electric power failure; "scorching" of the heated air (causing carbonized dust deposits in heated space); relatively large physical size; the need for electrical power and control wiring; and, generally noisy operation.

BRIEF DESCRIPTION OF THE INVENTION

The subject invention provides a fuel fired heating system which overcomes the above-discussed problems. A furnace or heating system formed in accordance with the subject invention can be fully self-contained with no need for electrical power or control wiring. The invention is such that a single furnace size can, for example, operate efficiently and provide very comfortable heating for any home requiring between 40,000 and 120,000 btu/hr maximum input. The system can provide fully modulating conditioned air circulated at low noise level and simultaneously the air is heating, filtered and not scorched. Further, since the blower is self-powered, there is no electric energy cost for blower operation which can amount to over 10% of the total operating cost of forced air furnaces.

All of the above is accomplished with a furnace unit having a relatively small physical size. Moreover, efficiencies in the range of 85 to 90 percent can be achieved throughout most of the operational range of the unit. This can be accomplished even when the maximum capacity of the unit is substantially oversized in terms of maximum heating requirements.

The furnace system shown in the preferred embodiment has five dynamic, operating, mechanical circuits interrelated to accomplish the complete function of the system, namely:

1. Environmental air circuit.
2. Fuel circuit.
3. Combustion circuit.
4. Heating vapor circuit.
5. Vacuum modulating circuit for controls.

All circuits are distinctly proportioned to each other enabling each to relate to the others in a coordinated manner. Each circuit also is dependent on all of the other circuits for the successful function of the complete device.

In accordance with the subject invention, the system preferably comprises a vapor generator having its vapor output directly connected to a variable speed expansion vapor power turbine. The exhaust of expanded vapor from the turbine is conducted to a condenser, condensed back to the liquid stage, and returned via a condensate pump to the generator. The entire liquid-vapor cycle is hermetically sealed and generally operates at subatmospheric pressure. Cooling of the condenser is accomplished by conducting the fluid to be heated, normally air (or water), through the condenser by a fluid pump or fan directly driven by the turbine at a variable speed proportional to the fuel input to the main burner. Preferably, and in accordance with the invention, the vapor generator is fired by a modulating gas burner controlled by a thermostat positioned in the space to which the air is supplied by the blower. The thermostat provides a demand signal proportional to the heating demand within the space to cause the burner to fire at a rate also proportional.

As a consequence of the above, the rate of vapor generation, the turbine speed, the fluid pump or fan speed, and the heat available in the condenser all modulate proportional to the demand level within the space being heated.

A more limited aspect of the invention contemplates that the effective flow area of either or both the combustion products flue outlet (upstream of the drafthood) and the combustion products vent (downstream of the built-in drafthood) will be controlled simultaneous with the modulating burner. Thus, combustion efficiency can be increased at all levels of operation and drafthood and appliance flue heat losses reduced.

Yet another aspect of the invention provides an improved structural arrangement for a heating system of the type described. In particular, it is contemplated that the vapor generator, the turbine and the condenser and flue outlet will be mounted in a common duct or housing. The mounting is such that the heating fluid or air being passed through the condenser is first caused to pass about the vapor generator, the turbine and then the flue pipe. Thus heat which would normally be lost is conserved and added to the heat being supplied to the space, before the heating fluid or air is moved through the condenser, whilst keeping the furnace jacket or housing at return air temperature which is a safety feature.

Still another somewhat limited aspect of the invention contemplates that the controls for the system will be vacuum type with the vacuum created in a known manner by the burner pilot. This allows the entire system to be self-contained and independent of any electrical supply.

OBJECTS OF THE INVENTION

Accordingly, a primary object of the invention is the provision of a full-modulating heating system, particularly suited for residential heating requirements.

A further object is the provision of a system of the type described which is capable of efficient operation throughout a major portion of its heating range.

Another object is the provision of a heating system which can be operated without any electrical wiring or external supply of electrical power for either control circuits or fan or pump power circuits.

Still another object is the provision of an air or fluid heating system in which the circulating pump or fan is driven at a variable speed proporational to the level of heat generation from minimum set point (adjustable set point—in the field of jobsite) to a maximum output. driven at a variable speed proportional to the level of heat generation from minimum set point (adjustable set point—in the field or jobsite) to a maximum output.

BRIEF DESCRIPTION OF THE DRAWINGS

The above and other objects and advantages will become apparent from the accompanying description when read in conjunction with the accompanying drawings wherein.

Figure 1:
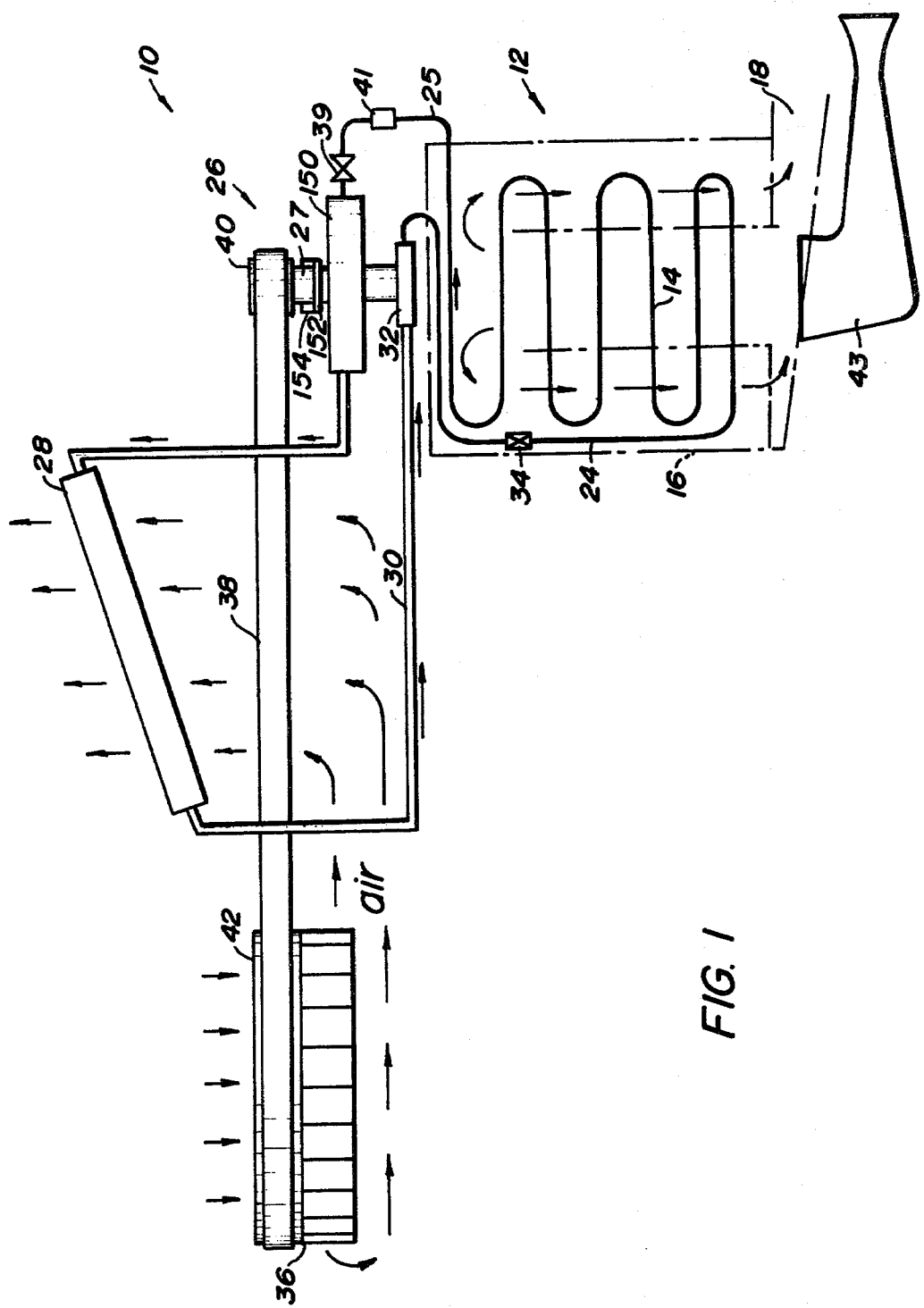
FIG. 1 is a diagrammatic showing of the general overall arrangement of a heating system formed in accordance with the subject invention.

Referring more particularly to the drawings wherein the showings are for the purpose of illustrating a preferred embodiment of the invention only, and not for the purpose of limiting same, FIG. 1 shown the overall arrangement of an air heating system 10 particularly suited for residential heating use and embodying the invention. In particular, the system 10 shown in FIG. 1 incorporates a relatively conventional, comparatively small sized, closed-loop, once-through type vapor generator 12. While many different types of working fluids could be used, in the subject embodiment the working fluid comprises water. The steam or vapor generator 12 is formed in a generally conventional manner and includes a single once-through flow path formed from suitable finned tubes 14 laid out in a sinuous or circuitous path adapted to be heated by the combustion products passing through the housing 16 and out the flue 18.

Figure 2:
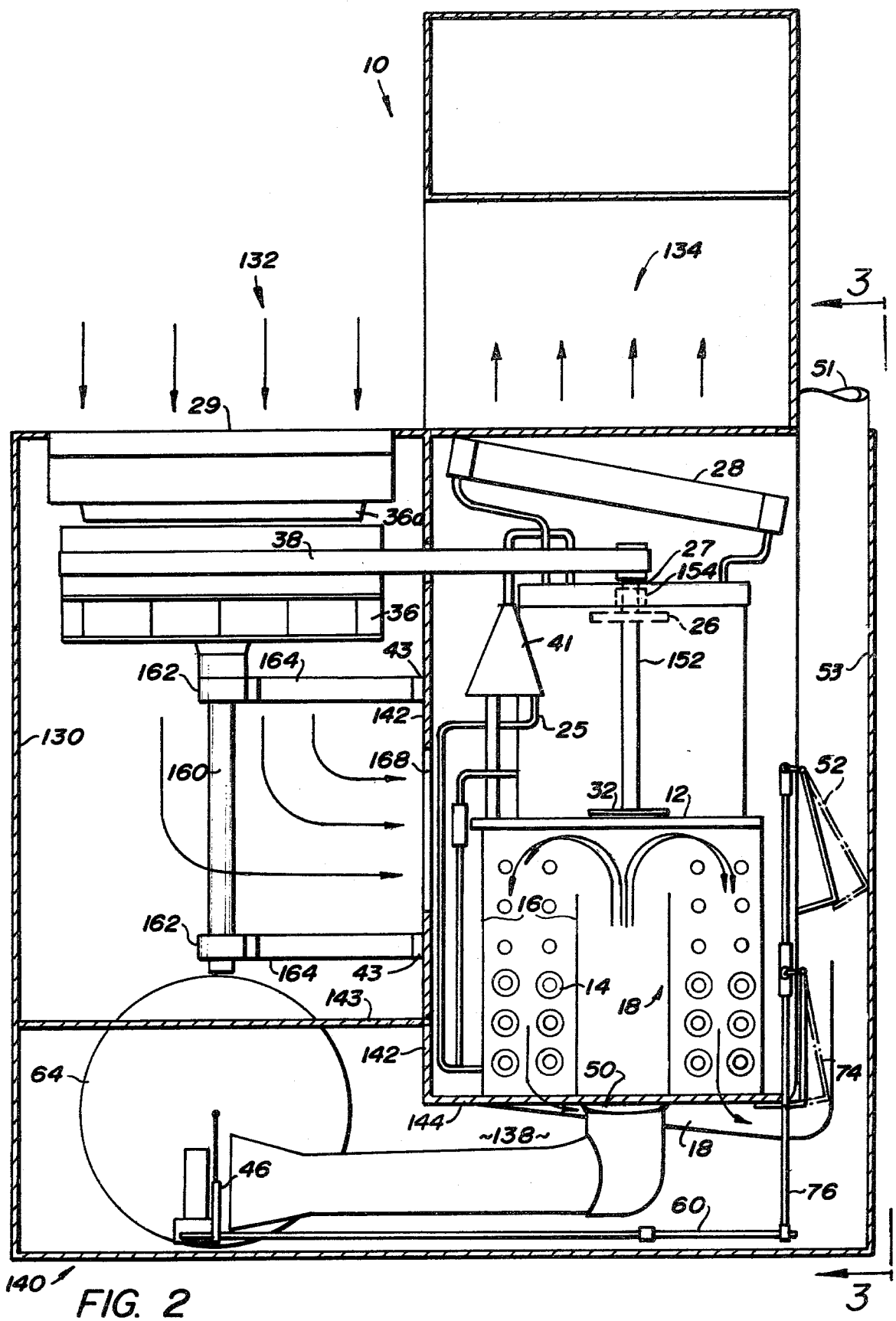
FIG. 2 is a somewhat schematic showing of a preferred structural embodiment with portions broken away to show the furnace working vapor circuit embodied in the invention.

Referring to FIG. 2 the vapor output from the vapor generator 12 is connected through a steam line 25 and steam separator 41 to a rotary, vapor power expander 26. In the subject embodiment, the expander 26 is a conventional turbine, and during passage through the turbine the fluid expands and performs work. The expanded vapor is thereafter conducted through a condenser 28 which cools the working fluid back to the liquid state after which it is taken through a condensate line 30 to a conventional feed-water pump 32 which is directly driven by the turbine and is supplied back to the vapor generator 12 at the vapor generator's working pressure.

Positioned in the turbine nozzle is a special adjustable hold-back valve 39 to prevent flow of vapor from the vapor generator 12 until the vapor generator has come up to operating minimum pressure. The initial hold-back pressure could be higher than the system operating pressure.

Positioned in the feed-pump condensate return line 24 is a check valve 34 to prevent steam back pressure in turbine housing 26 until turbine speed is sufficient to drive feed-water pump pressure high enough to pump water into steam generator.

Preferabley, to prevent contamination of the working fluid, the vapor system described above is a hermetically-sealed system and generally operates at sub-atmospheric pressure.

In accordance with one aspect of the subject invention, the steam condenser 28 serves as the environmental return air heating coil for the unit. As shown, air to be heated is moved over the heating coil 28 by a centrifugal fan 36.

In the subject embodiment, the fan 36 is directly driven from the turbine shaft 27. As shown, any type of direct mechanical drive connection can be provided between the turbine and the fan. Preferably, in the subject embodiment, the drive connection comprises a flat belt 38 suitably trained about the pulleys 40,42 mounted on the turbine and fan shafts, respectively.

By properly sizing the various components of the system, it is possible to match the power output of the turbine 26 with the power required by the fan 36 and the condensate return pump 32 and the air heating requirements of the space and cooling requirements of the condenser 28. Depending upon the rate at which the vapor generator 12 is fired, variable heat quantities can be directed to the conditioned space.

While it is apparent that the system could be constantly fired at a single rate and cycled on and off to maintain the conditioned space at the required temperature, according to a preferred embodiment the vapor generator is fired by a known type of modulating gas burner 43. The details of construction and operation of the know type of modulating gas burner are shown and described in U.S. Pat. No. 2,815,175 issued Dec. 3, 1957 to P. F. Swenson. The gas burner is made to modulate its firing rate through the necessary range by a vacuum control system as will be discussed later.

Figure 3:
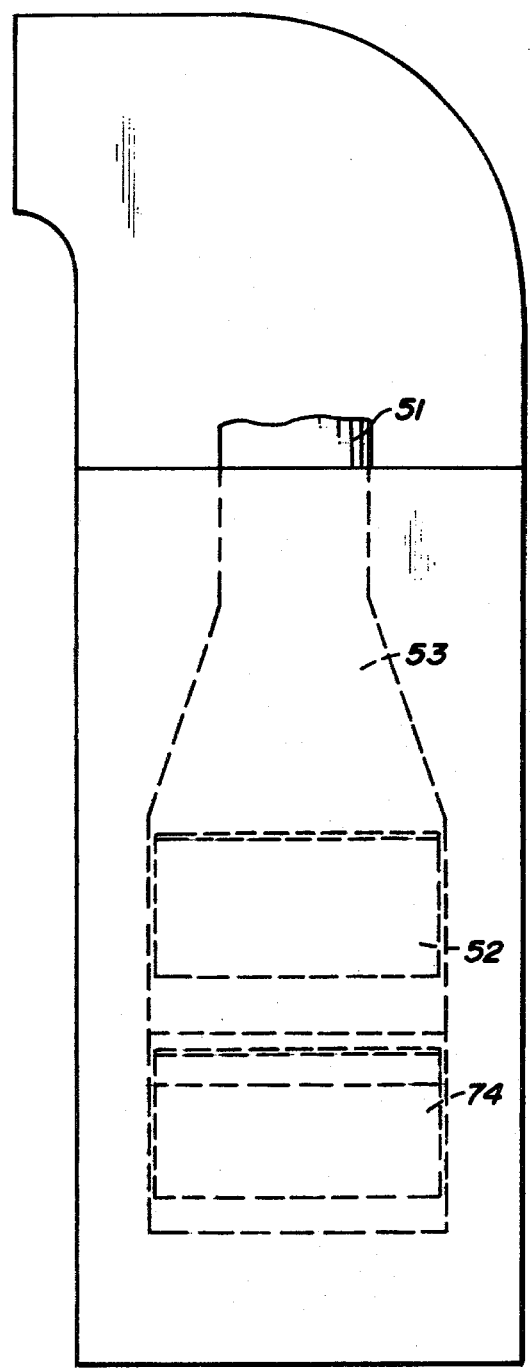
FIG. 3 is a view taken on line 3—3 of FIG. 2.

The described general system can be incorporated in a relatively compact and efficient structural unit of the general type shown in FIGS. 1 and 3. Components of FIGS. 2 and 3 which correspond to the components described with reference to FIG. 1 are identified by the same reference numerals. Broadly, the unit shown in FIGS. 1 and 3 comprise a sheet metal housing 130 which is, preferably, generally sealed except for a return air inlet opening 132, a hot air outlet opening 134 and a combustion air inlet opening 140. Also, the flue pipe 53 exists through a sealed opening 51. The interior of the furnace is divided into separate chambers 136 and 138 by suitable partition plate members 142, 143 and 144. The steam or vapor generator 12 is positioned at the bottom of chamber 136 and has its outlet flue 18 extending laterally to the right and up flue pipe 53.

The burner 43 is mounted in the second or lower chamber 138 sealed against leakage from chamber 136 and positioned directly under the steam or vapor generator. The burner and its controls will subsequently be described in greater detail.

As shown, the condensate or feed pump 32 and steam turbine 26 are carried in the chamber 136 in a housing 146 supported from the steam generator housing. The steam turbine wheel 150 is mounted for vertical shaft rotation and has its output shaft 152 connected through a conventional magnetic coupling 154 with a shaft extension 27. This provides a hermetically-sealed water system to prevent the vapor power cycle from being contaminated by atmospheric constituents.

The steam condenser 28 is supported from the sides of the housing. It is connected to receive the exhaust steam from the turbine and to return through line 30 the condensate to the feed pump 32 for return to the steam generator 12.

Mounted in the air inlet 132 of the furnace unit is an air inlet cone 36a and fan 36. The fan 36 has a vertically, downwardly-extending shaft 160 which is supported from thrust bearings 162 carried by brackets 164 extending inwardly of the chamber from tensioned supports 43. As shown, the fan is driven by the flat belt 38, kept in tension by supports 43, directly from the steam turbine output shaft. The fan or blower wheel preferably has a multiplicity of backward curved blades which induce a radial discharge of air. Immediately above the fan or blower wheel is the inlet cone 36a and an air filter 29 which extends across the return air flow inlet 132.

Air brought into the furnace by the fan 36 is discharged from the fan and pressurizes chamber 136. As shown, the air is caused to flow through opening 168 over and about the steam generator 12, the steam turbine housing 146 and flue pipe 53. Thus, all heated components in chamber 136 are cooled by a constant flow of air thereover. After flowing over the components and picking up heat of radiation and conduction the air passes through the condenser 28 where it is finally heated to the desired temperature. Since the condenser operates at a maximum temperature of the condensing steam, the air is never scorched, thus reducing carbonized dust emission to the heated space. Further, the fan develops sufficient pressure both negative at the return air inlet and positive at the warm air outlet to move the required air volume throughout the heated space, with greater or lesser flow as the demand requires. If the demand is below a set-point (which is adjustable at the jobsite to suit ducting and heating requirements) the furnace will shut down and wait for the demand to increase to the minimum set-point.

Since the housing or furnace jacket 130 is all-swept by cool (relatively) return air, the jacket is never warmer than return air, thus forming a safer installation. Nearly all heat radiation and conduction from the vapor generator, the turbine housing and the flue pipe is picked up by the cool air stream and passed on to the area to be heated.

Figure 4:
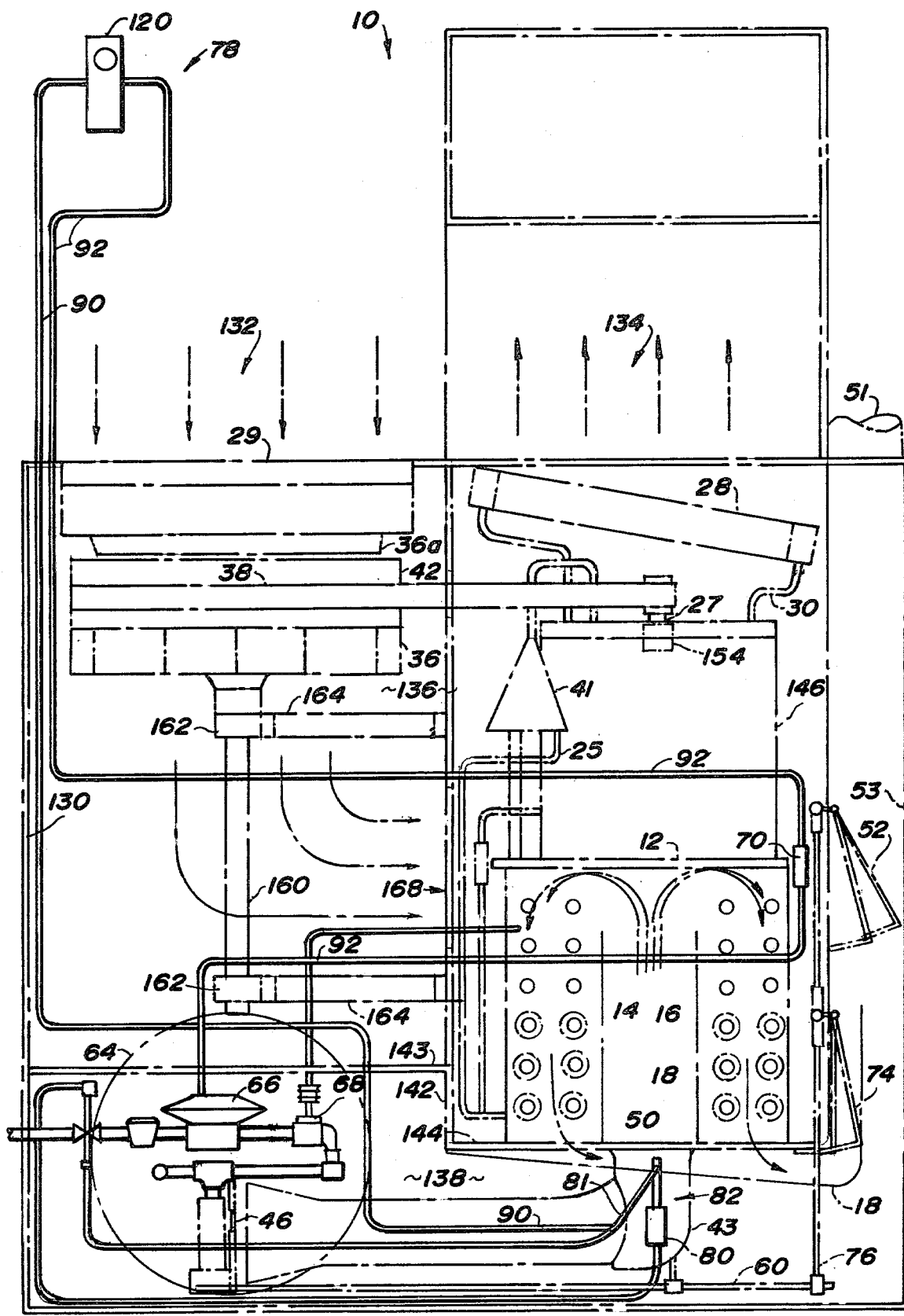
FIG. 4 is a view similar to FIG. 2 but showing the control system superimposed on the structure.

FIG. 4 illustrates in somewhat schematic form the vacuum control system previously mentioned. The system includes a vacuum diaphragm motor or driver 66 which controls the main gas valve. This valve controls flow and pressure to the main burner port and to a driver diaphragm 64. This valve controls flow and pressure to the main burner port and to a driver diaphragm 64. Diaphragm 64 in turn controls the gas port opening, flame port opening, flue damper and vent damper positions. Vacuum pressure as it varies acting against the diaphragm valve 66, therefore, will vary simultaneously the amount of gas supplied to the burner mixing tube as well as the opening of the burner flame port and the positions of the flue and vent dampers.

Therefore, in addition to controlling gas flow and the flame port opening, the subject embodiment, by controlling the flue and vent damper provides means for controlling secondary combustion air and drafthood dilution air flow. As mentioned previously, the burner assembly is mounted in chamber 138 isolated from the return air and having a pivoted flue damper 74 which controls the area of the flue outlet 18 of the vapor generator 12. A link 76 extends from crank 60 to dampers 74 and 52 to control combustion air flow and drafthood dilution air flow by modulating outlet areas simultaneous with the firing rate.

In the subject embodiment, the means for controlling the vacuum pressure supplied to the diaphragm 66 and, accordingly, the firing rate of the burner and the secondary air supply, comprise a vacuum control system 78 in which the required vacuum is generated by an aspirating portion 80 of a pilot burner assembly 82. Prior mentioned U.S. Pat. No. 2,815,175 describes fully the vacuum system operation, and the disclosure of said patent is incorporated herein by reference. However, the vacuum operated control valve has been simplified and now operates as described hereafter.

The aspirating pilot 80 develops a constant vacuum in line 90 and the vacuum at the diaphragm 66 is varied by using a heat sensing thermostat 120 as embodied in U.S. Pat. No. 2,815,175 which has a bimetallic driven valve element that opens in proportion to the temperature of the heated space. When the temperature rises and causes the valve to open, it reduces the vacuum in line 90 thereby reducing the vacuum pressure in diaphragm 66 which reduces gas flow and further reduces gas pressure in diaphragm 65, flame port opening and flue and vent damper outlet areas. A pilot safety 100% cutoff 81 is provided by a bimetal element close connected to aspirating pilot assembly 82 to completely shut-down the furnace in the event the aspirating pilot blows out.

As part of the vapor generator controls, the vacuum circuit also provides a limit on temperature of the generator with a controller 70 in series with the main thermostat. If the temperature goes too high in the generator the vacuum breaker in the controller will break vacuum in the diaphragm 66 and close the main control valve. For pressure control of the generator, a bellows valve 68 is utilized downstream of the diaphragm valve 66 and is set for a generator pressure limit.

As is apparent from the foregoing, the entire system is totally self-contained and obtains all of its operating power from the gas supply. Note that even thermostat and control system are operable so long as gas is available for firing the unit. This total absence of reliance on outside electrical power is particularly advantageous. Additionally, even the mechanical operation energy of the turbine in driving the fan is converted to heat and passed on into the air stream with no loss and substantially all of the available gas energy is used for the primary function of heating the air. While in a stand-by condition, the vent and flue dampers will be closed, thus minimizing heated space and appliance heat exchanger losses up the chimney which is a great source of loss in the standard installation.

The invention has been described in great detail sufficient to enable one of ordinary skill in the art to make and use the same. Obviously, modifications and alterations of the preferred embodiment will occur to others upon a reading and understanding of the specification and it is my intention to include all such modifications and alterations as part of my invention insofar as they come within the scope of the appended claims.

What is claimed is:

1. A self-contained, self-starting, heat powered air heating system for residential use comprising:
   a vapor generator for converting a liquid to a vapor;
   a rotary vapor turbine mounted in a container and connected for receiving all of the vapor coming from said vapor generator and producing work during the expansion of the vapor passing therethrough;
   a heat exchanger mounted at an elevation above said vapor generator for receiving all of the vapor exhausting from said turbine and operating at subatmospheric pressure for condensing said vapor;
   feed pump means directly driven by said turbine and mounted at an elevation below the heat exchanger and between the heat exchanger and the vapor generator in a fluid flow relationship and connected to return said condensed vapor from said heat exchanger to said vapor generator;
   fa means located exteriorly of said turbine container for conducting air over said heat exchanger to extract heat therefrom;
   hermetically sealed drive means connecting said turbine to drive said fan means without shaft penetration of said container;
   said vapor generator, said turbine, and said heat exchanger being connected in a hermetically sealed closed-loop cycle;
   a gas burner for heating said vapor generator; and,
   control means for controlling the flow of fuel to said burner including a thermostat responsive to the demand for heat at the point of use.

2. The heating system as defined in claim 1 wherein said vapor generator, said turbine, and said heat exchanger are mounted in a housing and said fan means is arranged to cause air to flow over said vapor generator and said turbine prior to passing over said heat exchanger.

3. The heating system as defined in claim 1 wherein said control means includes means for preventing operation of said burner until the demand for heat reaches an adjustable predetermined minimum level.

4. A self-contained, self-starting, heat powered air heating system comprising:
   a vapor generator for vaporizing a fluid;
   an expansion vapor turbine mounted in a container and connected to receive the vaporized fluid from said vapor generator;
   a condenser operating at subatmospheric pressure connected to receive and condense the vapor discharged from said turbine; said condenser mounted at an elevation above said vapor generator;
   a pump mounted in said container at an elevation below said condenser and driven by said turbine and connected between said condenser and said vapor generator for returning the condenser fluid from said condenser to said vapor generator;
   said vapor generator, said turbine, said condenser and said pump being connected in a hermetically sealed closed-loop cycle;
   a gaseous fuel burner for heating said vapor generator;
   a housing and fan means for conducting air about said condenser for cooling said condenser and heating said air and supplying said heated air to a point of distribution for end use;
   hermetically sealed drive train means for drivingly connecting said turbine to said fan means without shaft penetration of said container whereby said turbine drives said fan means and said pump in a hermetically sealed system;
   control means including thermostat means responsive to the demand for heat at said point of use for controlling the firing of said burner.

5. A heating system as defined in claim 4 wherein said vapor generator and said condenser are mounted in a housing with said condenser mounted at an elevation above both said vapor generator and said pump and wherein the air conducted through said condenser is first conducted about said vapor generator and then through said condenser.

6. A heating system as defined in claim 5 wherein said turbine container is mounted in said housing and wherein all of the air conducted over said condenser is conducted about the housing of said turbine prior to being conducted over said condenser.

7. A heating system as defined in claim 5 including means for preventing firing of said burner until the demand for heat at said point of use reaches an adjustable predetermined minimum level.

8. The heating system as defined in claim 5 including means responsive to the pressure within said vapor generator to prevent flow of vapor to said turbine until the vapor pressure within said vapor generator reaches a predetermined minimum level relative to the pressure extant in said turbine housing.

9. The heating system as defined in claim 5 wherein said housing and said fan are arranged to cause air to flow in said inlet opening through said housing, and in serial order over said boiler, said turbine, said condenser, and then out said outlet opening.

10. The heating system as defined in claim 4 wherein said gaseous fuel burner is a modulating gas-fired burner system, said modulating burner system including control means responsive to the demand for heat within a space for varying the firing level of said burner system proportional to said demand to thereby cause said vapor generator to produce vapor in proportion to said demand and cause said turbine to run at a speed responsive to said demand.

11. The heating system as defined in claim 10 wherein said modulating burner system includes means for controlling both the flow of combustion gas products therefrom and dilution air input downstream of the drafthood flow of fuel to said burner.

12. A heating system as defined in claim 11 wherein said means for controlling the flow of combustion flue gas products upstream of the drafthood and dilution air downstream of the drafthood includes a double damper system controlled by said burner and damper control means to modulate damper system in conjunction with the modulation of said burner.

* * * * *